(No Model.) 2 Sheets—Sheet 1.

A. WAHLIN.
CENTRIFUGAL CREAMER AND BUTTER EXTRACTOR.

No. 498,829. Patented June 6, 1893.

Witnesses
Chas. H. Smith
J. Staib

Inventor
Adolph Wahlin
per Lemuel W. Serrell (No Model.) 2 Sheets—Sheet 2.
A. WAHLIN.
CENTRIFUGAL CREAMER AND BUTTER EXTRACTOR.
No. 498,829. Patented June 6, 1893.

Witnesses
Chas N Smith
J Staib

Inventor
Adolph Wahlin
per Lemuel W. Serrell
Atty.

UNITED STATES PATENT OFFICE.

ADOLPH WAHLIN, OF STOCKHOLM, SWEDEN, ASSIGNOR, BY MESNE ASSIGNMENTS, TO THE SWEDISH CREAM AND BUTTER SEPARATOR COMPANY, OF NEW JERSEY.

CENTRIFUGAL CREAMER AND BUTTER-EXTRACTOR.

SPECIFICATION forming part of Letters Patent No. 498,829, dated June 6, 1893.

Application filed November 7, 1892. Serial No. 451,155. (No model.)

*To all whom it may concern:*

Be it known that I, ADOLPH WAHLIN, a subject of the King of Sweden and Norway, residing at Stockholm, Sweden, have invented an Improvement in Centrifugal Creamers and Butter-Extractors, of which the following is a specification.

The mode of operation of this butter separator or accumulator is somewhat similar to that set forth in my Patent No. 447,530, that is to say, the cream after it has been separated is caused to progress in a very thin layer over a surface that is rapidly rotated, in order that the watery particles may be thrown off and allow the buttery particles to come in contact and coalesce.

The special feature of the present invention relates to a separator in which the cream can be taken off from the centrifugal apparatus and the butter making suspended, or by a slight change in the position of the parts the butter separating or accumulating apparatus can be brought into action.

Figure 1:
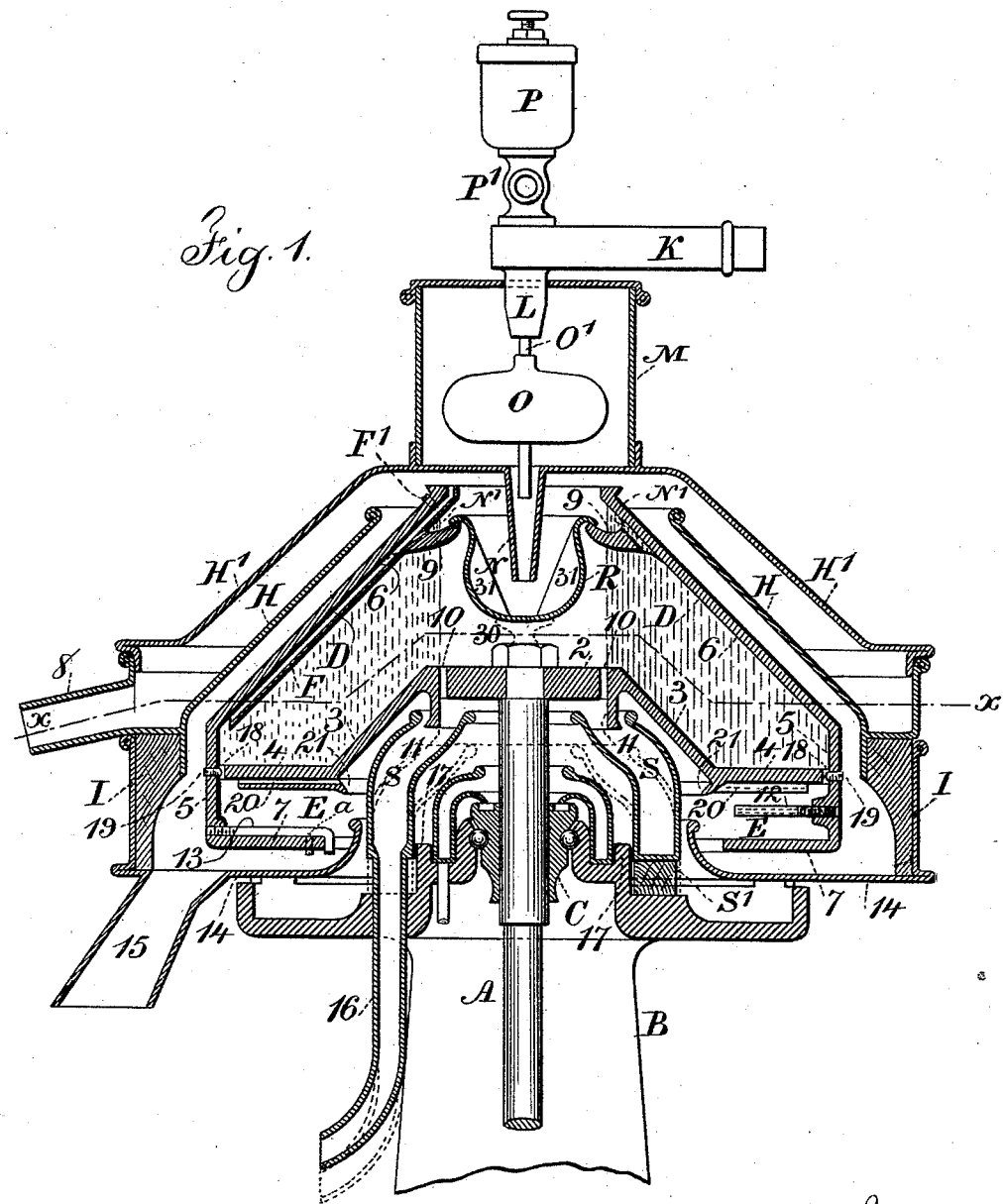
Figure 2:
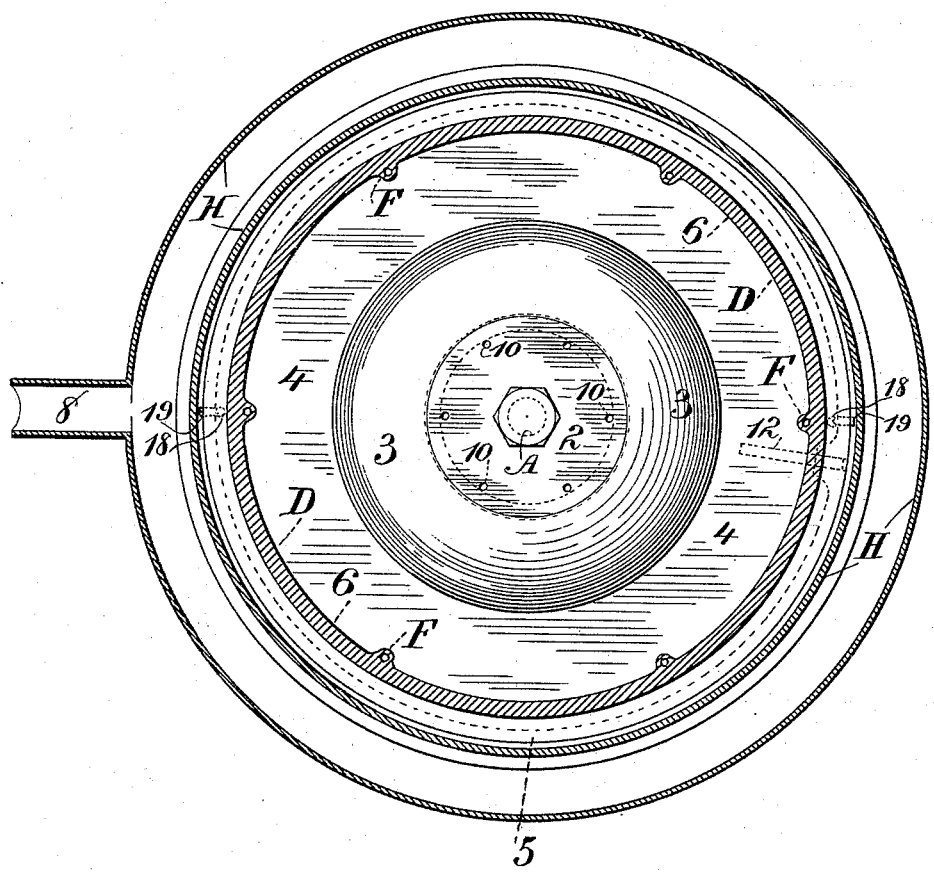

In the drawings, Figure 1 is a vertical section representing my present improvements, and Fig. 2 is a sectional plan below the line $x, x$.

The central shaft A is supported in any suitable framework and rotated in the usual manner. I have shown a portion of the frame at B and the upper journal or bearing at C. The bowl D has a flat central portion 2 and a conical bottom 3 extending to the nearly flat annular portion 4, around which is the cylindrical portion 5, and above this is the conical portion 6 of the bowl; and below the flat annular portion 4 and at the bottom end of the cylindrical portion 5 is the inwardly projecting annular rim 7 forming a butter separating chamber E, and there are one or more skim milk pipes F within the conical portion 6 of the bowl, opening near the interior of the largest portion of the conical cream chamber G for the reception of the skim milk, and the discharge end of such pipe F is at or near the mouth of the bowl, as usual in the De Laval separator, and around the upper end of the separator any suitable cover or pan is provided for the reception of the skim milk. I have shown the conical vessel H with a removable cover H' and a delivery pipe or spout at 8, and this vessel H is preferably supported by a rim or curb I.

The milk is supplied to this centrifugal separating apparatus in any suitable manner. It is advantageous to make use of a supply pipe K with a downwardly projecting pipe L from which the milk runs into the vessel M that rests upon the cover H' and has a downward discharge spout N. Within the vessel M is a float O, the upper end of which acts as a valve against the end of the pipe L to check the flow of the milk when the liquid rises too high in the vessel M, and the reverse; and this float O is guided by a stationary pipe O' that conducts coloring material from the vessel P into the milk.

One feature of my present improvement relates to the auxiliary separator R which is in the form of a pan within the bowl D. The upper edges of this auxiliary separator are formed as an outwardly flaring rim below the top edge of the conical bowl D, and this auxiliary separator is supported by a ledge 9 extending inwardly and below the rim of the auxiliary separator, and this ledge is inclined or grooved to form an annular channel, and there are holes at N'. This auxiliary separator receives a rotary motion from the main cream separating bowl and the milk running into this auxiliary separator is spread in a comparatively thin layer upon the interior thereof and is delivered from the edge of this auxiliary separator into the annular channel and runs through the holes N' to the interior surface of the conical portion 6 of the bowl, and such materials follow along this conical surface and the watery portions separate from the cream, the cream passing toward the axis of the centrifugal separator and the watery portions moving outwardly to the portion of the bowl that is of the largest diameter, and from there the skim milk is discharged through the pipe F, as in cream separators, and passes to the cover and conical vessel H H'.

In the flat or nearly flat portion 2 of the separator bowl there are cream discharge openings 10, and these openings are slightly farther from the center than the edges of the conical portion 6 of the bowl, so that the cream will discharge downwardly from the vertical cream wall, instead of upwardly over the top edge of the bowl, and there is below the bottom 2 and outside of the cream openings 10 a downwardly projecting annular rim 11 upon which the cream spreads and from the outer edge of which it is delivered.

In the manufacture of butter the cream is delivered from the edge of the rim 11 upon the interior of the conical bottom 3, and such cream is spread in a very thin layer upon such conical surface by the very rapid centrifugal action in order that the watery portions may be thrown off and the buttery portions caused to float and coalesce upon the surface of the watery portions. Hence when the materials pass from the conical surface of 3 into the butter separating chamber E the separation is still further continued by the watery portions being thrown to the outer part of such butter separating chamber, while the buttery portions still further coalesce in the inner portion of such butter separating chamber, and from this chamber the watery portions and the buttery portions may be removed in any convenient manner.

I have represented the pipe 12 as passing from near the surface of the materials in the butter separating chamber for the butter globules to be passed off from this chamber, and the pipe 13 as passing from the outer portion of such chamber E inwardly and discharging over the edge of the annular rim 7 for the watery portions to be discharged from such butter separating chamber E. The pipe 12 is preferably screw threaded and received into a screw threaded hole in the wall 5 so that it may be adjusted to bring its inner end nearer to or farther from the axis of rotation and regulate the discharge of the buttery and watery materials. The pipe 13 may be provided with a screw, as shown at $a$ to regulate the discharge through such pipe.

The buttery portions and the watery portions may be led away separately if desired, but I find it advantageous to discharge these materials into the same annular receiving chamber in order that the presence of the watery portions may lessen the risk of the buttery portions adhering to the surface of such annular chamber; and I have represented the annular chamber as formed by the curb I and the inwardly projecting annular flange 14 upturned at its inner edge. This annular chamber is provided with a discharge pipe 15, through which the buttery and watery particles are led away, and it is advantageous to make the interior surface of this rim or curb I concave, as represented, so that the buttery portions will strike against an inclined surface and glance off, instead of adhering thereto.

In order to adapt this separator to the delivery of cream instead of the separation of butter, I employ the annular cream receiver S below the separating bowl and provided with a discharge pipe 16 at the bottom, and the open annular upper end of this cream receiver is of a size to receive within it the rim 11. Hence when this receiver S is raised to the position shown by full lines, the cream is delivered from the rim 11 into this cream receiver and flows away by the pipe 16, but when this receiver S is lowered to the position shown by dotted lines, it is below the bottom of the rim 11, and the cream is thrown off from such rim upon the conical interior surface of the bottom portion 3 of the bowl, to be separated in the butter accumulator portion of the apparatus, as before described.

Any desired mechanism may be made use of for raising and lowering the annular cream receiver S. A convenient way of accomplishing this object is to lift the receiver by hand and place two or more blocks S' beneath the same, such receiver being held in its proper position by the rim 17 that surrounds the journal bearing C.

It is advantageous to provide several skim milk pipes F placed at equal distances around and within the separating bowl D, and each pipe should be provided with a regulating screw F' to determine the discharge of the watery portions the same as heretofore made use of in the De Laval separator.

In cases where the presence of watery material in the butter separating apparatus is required or advantageous, holes may be provided at 18 around the interior of the separating bowl and passing through the flat annular portion 4 of such bowl into the butter separating chamber E, and such holes should each be provided with a screw 19 introduced from the outside by which such holes can be wholly or partially closed to regulate the quantity of watery materials passing into the butter separating chamber.

I find it also advantageous to provide an annular rim or lip 21 at the lower portion of the under surface of the conical bottom 3 with two or more tubular outlets 20 extending outwardly to near the bottom or larger diameter of the butter separating chamber E in order that the buttery and watery portions may pass from the conical butter separating surface into the butter separating chamber, and the lighter and buttery portions will pass toward the axis of the separator and the heavier or watery portions are driven outwardly by the centrifugal action.

The auxiliary separator R may receive its support from a column or stand below the said separator and connected at the interior of the main bowl, as shown by dotted lines at 30, and wings may be introduced inside this separator as at 31 to give motion to the milk as introduced into the same.

I claim as my invention—

1. In a centrifugal separating apparatus, a bowl having a conical bottom rising within the separating chamber and having an opening passing downward through the bottom and adjacent to the smaller diameter of the conical portion, so that the cream as delivered from the cream separating bowl is passed downwardly and spread upon the conical under surface of the bowl for the separation of the watery from the buttery portions, substantially as set forth.

2. The combination in a centrifugal separating apparatus, of a bowl, means for supplying milk into such bowl, a conical bottom rising within the separating chamber of the bowl, and having openings therethrough for the downward delivery of the cream from the cream separating bowl upon the under conical surface of the bowl, and an annular butter separating chamber below the bottom portion of the bowl, and an annular chamber for the reception of the buttery and watery portions from the butter-separating chamber, substantially as set forth.

3. A combined cream and butter separating bowl having a conical bottom rising within the separating chamber, and having cream discharge openings through the bottom and a downwardly projecting rim upon the bottom and around the cream discharge openings for delivering the cream from the edge of the rim upon the conical butter-separating surface, substantially as set forth.

4. A combined cream and butter separating bowl having a conical bottom rising within the separating chamber and cream discharge openings through the bottom and a downwardly projecting rim upon the bottom and around the cream discharge openings for delivering the cream from the edge of the rim upon the conical butter separating surface, and an annular butter separating chamber below the bowl and into which the buttery and watery particles pass from the conical surface, substantially as set forth.

5. A combined cream and butter separating bowl having a conical bottom, cream discharge openings through the bottom and a downwardly projecting rim upon the bottom and around the cream discharge openings for delivering the cream from the edge of the rim upon the conical butter separating surface, an annular butter separating chamber below the bowl and into which the buttery and watery particles pass from the conical surface, a lip below the conical surface and around the larger diameter thereof and tubular outlets from such rim into the butter separating chamber, substantially as set forth.

6. The combination with a centrifugal cream separating bowl having a butter separating surface, cream discharge openings and an annular rim around the cream discharge openings, of a movable cream receiver adapted to pass around the annular rim for intercepting the cream before it reaches the butter separating surface so as to change the centrifugal butter separating apparatus into a cream separator, substantially as set forth.

7. The combination with a centrifugal cream separator, of a separate auxiliary milk receiving and separating vessel of smaller diameter than the opening in the top of the cream separator, so that such auxiliary vessel may be removed or replaced, and means for supporting said auxiliary vessel with its annular upper edge below the top of the cream separator, whereby the milk is subjected to a centrifugal action and delivered in a thin layer over the upper edge of the auxiliary separator to the interior of the cream separator, substantially as set forth.

8. The centrifugal cream separating bowl having a conical cream separating chamber, a conical bottom to the bowl forming on its under side a butter separating surface, cream delivery openings through the bottom, in combination with an annular cream receiver below the bottom and adapted to being raised or lowered in relation to the cream separating outlets, and a rim and pan for the reception of the buttery and watery portions from the butter separator, substantially as set forth.

9. A centrifugal cream and butter separating bowl having a conical bottom extending up into the cream separating chamber, and having cream openings extending downwardly through the bottom of the bowl, through which the cream passes to the conical under surface of the bottom, for the watery portions to separate from the buttery portions by the centrifugal action, an annular butter separating chamber below and around the conical butter separating surface, the bottom of the main separator also having one or more openings near the inner surface of the cream separating bowl for allowing the skim milk or watery portions from the cream separating chamber to pass into the said annular butter separating chamber, substantially as set forth.

10. The combination with a centrifugal cream separator, of a separate auxiliary separating vessel within and removable from the upper part of the centrifugal cream separator, and a ledge around within the cream separator for supporting the auxiliary separator, the ledge having openings through it for the passage of the milk, substantially as set forth.

Signed by me this 31st day of October, 1892.

ADOLPH WAHLIN.

Witnesses:
 GEO. T. PINCKNEY,
 A. M. OLIVER.